(12) United States Patent
Inou et al.

(10) Patent No.: US 8,131,443 B2
(45) Date of Patent: Mar. 6, 2012

(54) ACCELERATION CONTROL SYSTEM

(75) Inventors: Hiroshi Inou, Kariya (JP); Minoru Okada, Gifu (JP); Seiji Totsuka, Tokai (JP)

(73) Assignee: Denso Corporation, Kariya (JP)

(*) Notice: Subject to any disclaimer, the term of this patent is extended or adjusted under 35 U.S.C. 154(b) by 924 days.

(21) Appl. No.: 12/214,979

(22) Filed: Jun. 24, 2008

(65) Prior Publication Data

US 2008/0314666 A1    Dec. 25, 2008

(30) Foreign Application Priority Data

Jun. 25, 2007  (JP) ................. 2007-166848
Jul. 2, 2007   (JP) ................. 2007-174125

(51) Int. Cl.
*B60K 31/00* (2006.01)
(52) U.S. Cl. ............. 701/93; 701/70; 180/170; 180/282
(58) Field of Classification Search .......... 701/70, 701/93; 180/170, 282
See application file for complete search history.

(56) References Cited

U.S. PATENT DOCUMENTS

| | | | |
|---|---|---|---|
| 4,650,020 A | 3/1987 | Mizuno et al. | |
| 5,646,850 A | 7/1997 | Ishida et al. | |
| 5,902,345 A * | 5/1999 | Minowa et al. | 701/96 |
| 6,360,158 B1 * | 3/2002 | Hanawa et al. | 701/93 |
| 7,294,938 B2 | 11/2007 | Miyao | |
| 2005/0171678 A1 | 8/2005 | Takahashi et al. | |

FOREIGN PATENT DOCUMENTS

| | | |
|---|---|---|
| JP | 63-291737 | 11/1988 |
| JP | 01-206404 | 8/1989 |
| JP | 03-076247 | 4/1991 |
| JP | 05-058193 | 3/1993 |
| JP | 05-221254 | 8/1993 |
| JP | 06-255393 | 9/1994 |
| JP | 10-250409 | 9/1998 |
| JP | 11-278098 | 10/1999 |
| JP | 2000-043611 | 2/2000 |
| JP | 2000-301965 | 10/2000 |
| JP | 2006-170069 | 6/2006 |
| JP | 2006-290331 | 10/2006 |
| WO | WO 01/47735 | 7/2001 |

OTHER PUBLICATIONS

Office action dated May 19, 2009 in Japanese Application No. 2009-174125.
Morimoto, "Introduction to CVT" Grandprix publication company, Oct. 2004.
Search Report dated Sep. 3, 2008 in European Application No. 080 09 722.3.

* cited by examiner

*Primary Examiner* — Tony H. Winner
*Assistant Examiner* — Jacob Knutson
(74) *Attorney, Agent, or Firm* — Harness, Dickey & Pierce, PLC

(57) ABSTRACT

An acceleration control system controls acceleration of a vehicle to match the driver's feeling. In this control, the vehicle is controlled so that acceleration remains constant at the initial stage and then a differentiated value of a square power of a vehicle speed remains constant. This control is based on the finding of a normal acceleration operation attained by a driver. A linear relation exists between the acceleration in the initial stage of acceleration and the differentiated value of the square power of the speed. Switching of control from the constant acceleration to the constant differentiated value of the square power of the speed is made at a change-over speed determined by the linear relation.

18 Claims, 4 Drawing Sheets

US 8,131,443 B2

ACCELERATION CONTROL SYSTEM

CROSS REFERENCE TO RELATED APPLICATION

This application relates to and incorporates herein by reference Japanese Patent Applications No. 2007-166848 filed on Jun. 25, 2007 and No. 2007-174125 filed on Jul. 2, 2007.

FIELD OF THE INVENTION

This invention relates to an acceleration control system for controlling acceleration of a vehicle and, particularly, to an acceleration control system capable of controlling the acceleration to match driver's feeling.

BACKGROUND OF THE INVENTION

In one conventional acceleration control system for a vehicle, when a target speed of vehicle travel is set, vehicle acceleration control is executed so as to automatically assume the target speed (for example, U.S. Pat. No. 4,650,020, JP 3-76247B). According to this system, immediately after the start of control, the target speed is set at a value higher than an actual vehicle speed by a predetermined value and, thereafter, the target speed is linearly increased. When the target speed is linearly increased as above, the acceleration becomes nearly constant (unchanged).

When the vehicle is constantly accelerated up to the target speed, however, the driver often feels the controlled operation scary or finds the controlled acceleration offensive.

In another conventional acceleration control system for a vehicle, to realize acceleration that matches driver's acceleration feeling, an acceleration characteristic is selected depending upon the individual driver's ability and drive feeling, and the acceleration control is executed based on the selected acceleration characteristic (for example, JP 6-255393A).

When the acceleration is controlled by selecting an acceleration characteristic depending upon the individual driver's ability and drive feeling, the acceleration characteristic must be adjusted in advance to match the individual driver's ability and drive feeling. This adjusting operation is cumbersome and, besides, a number of acceleration characteristics must be provided.

SUMMARY OF THE INVENTION

This invention has an object of providing an acceleration control system capable of easily controlling acceleration to match driver's feeling.

According to a study made in order to achieve the above object, it was found that, when a driver accelerates a vehicle by operating an accelerator pedal by himself or herself, he or she usually accelerates at a constant rate in the initial stage of acceleration. After a resulting increase in travel speed, he or she then accelerates at such a rate that a differentiated value of the square power of the speed remains constant irrespective of the driving technique of the driver or irrespective of the degree of acceleration. It was further found that the period of acceleration at the constant rate is relatively short and in most of the period of acceleration, the vehicle is accelerated at such a rate that the differentiated value of the square power of the speed remains constant.

The present invention is based on this fining. According to one aspect, an acceleration control system controls a vehicle so that a differentiated value of a square power of a speed of the vehicle remains constant during a cruise control.

Preferably, the acceleration control system sets a target acceleration to a constant value at an initial stage of acceleration and controls the vehicle in accordance with the constant value as a primary control so that the acceleration remains constant. After this primary control, the acceleration control system controls the vehicle as a secondary control so that the differentiated value of the square power of the speed remains constant. The target acceleration for the primary control and the target differentiated value of the square power of the speed for the secondary control are defined and stored as a linear function, and the switching from the primary control to the secondary control is made based on the stored relation.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1A:
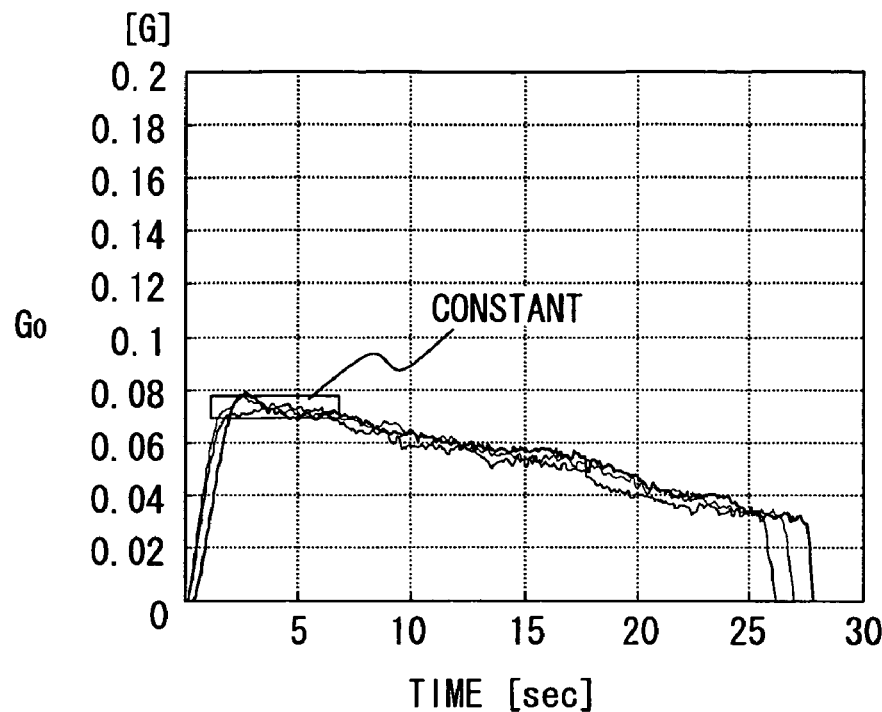
FIG. 1A is a graph illustrating a relation between time and acceleration Go in an experiment.
Figure 1B:
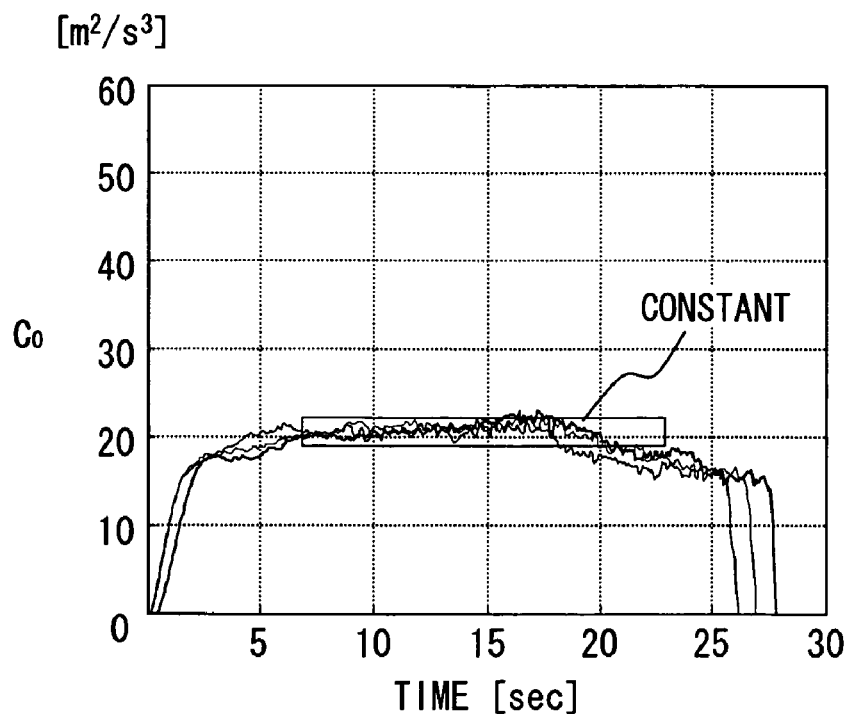
FIG. 1B is a graph illustrating a relation between time and a differentiated value of a square power of speed Co in the experiment.

Referring first to FIGS. 1A and 1B, experimental results are shown, which are measured when a driver has operated an accelerator (accelerator pedal) so that the intensity of acceleration feeling becomes an intermediate degree and constant. It will be understood from FIG. 1A that the acceleration Go is nearly constant in the initial stage of acceleration (e.g., 2 to 7 seconds), and gradually decreases after the elapse of a given period of time (e.g., 7 seconds). However, it will be understood from FIG. 1B that a differentiated value of the square power of the speed Co remains nearly constant after the initial stage of acceleration. It will be further understood from FIGS. 1A and 1B that the results of experiment conducted three times and indicated by three lines are nearly the same and the experiment is reproducible.

In the above experiment, the accelerator is so operated that the acceleration feeling is of an intermediate degree and is constant. Even when the accelerator is so operated as to obtain a large acceleration feeling or is so operated as to obtain a small acceleration feeling, the acceleration Go becomes nearly constant in the initial stage of acceleration and gradually decreases after the elapse of a given period of time. However, the differentiated value of the square power of the speed Co becomes nearly constant provided the accelerator is so operated that the acceleration feeling remains constant during the acceleration.

Figure 2:
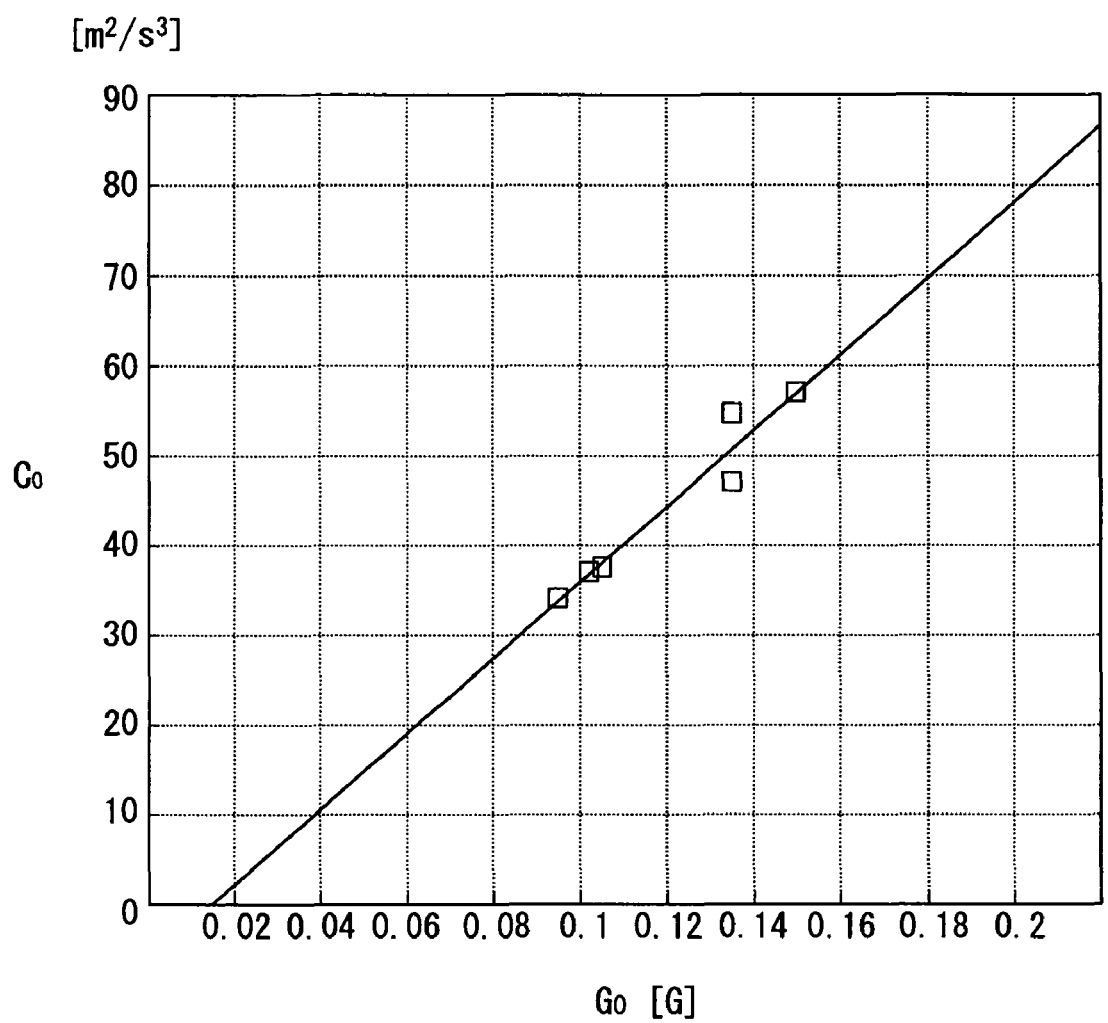
FIG. 2 is a graph illustrating a linear relation between the acceleration Go that assumes a constant value in an initial stage of acceleration and the differentiated value Co of the square power of the speed that assumes a constant value.

Based on these data, the relation between the acceleration Go and the differentiated value of the square power of the speed Co is analyzed. As a result, it is found that a linear relation exists between Go and Co as shown in FIG. 2.

Next, described below is that a travel speed V which changes from the state where the acceleration Go is constant over to the state where the differentiated value of the square power of the speed Co is constant (hereinafter referred to as change-over speed Vc) is determined from Go and Co.

The following Equation 1 holds in the state where the acceleration Go remains constant. Further, the following Equation 2 holds in the state where the differentiated value of the square power of the speed Co remains constant. The left side of the Equation 2 can be transformed into the Equation 3.

$$\frac{d}{dt}V = G_0 \qquad \text{Eq. 1}$$

$$\frac{d}{dt}V^2 = C_0 \qquad \text{Eq. 2}$$

$$\frac{d}{dt}V^2 = 2V \cdot \frac{d}{dt}V \qquad \text{Eq. 3}$$

At the speed at which the state where the acceleration is constant changes over to the state where the differentiated value of the square power of the speed is constant, i.e., at the change-over speed Vc, both Equation 1 and Equation 2 hold. By taking Equation 3 into consideration, therefore, the following Equation 4 holds. Equation 4 can be transformed into Equation 5. As will be understood from Equation 5, the change-over speed Vc is determined by Go and Co. In Equation 5, Co/Go is a gradient of the linear relation that is shown in FIG. 2. It can, therefore, be ascertained that the change-over speed Vc is determined from a relation between Go and Co.

$$2V_c \cdot G_0 = C_0 \qquad \text{Eq. 4}$$

$$V_c = \frac{C_0}{2G_0} \qquad \text{Eq. 5}$$

Figure 3:
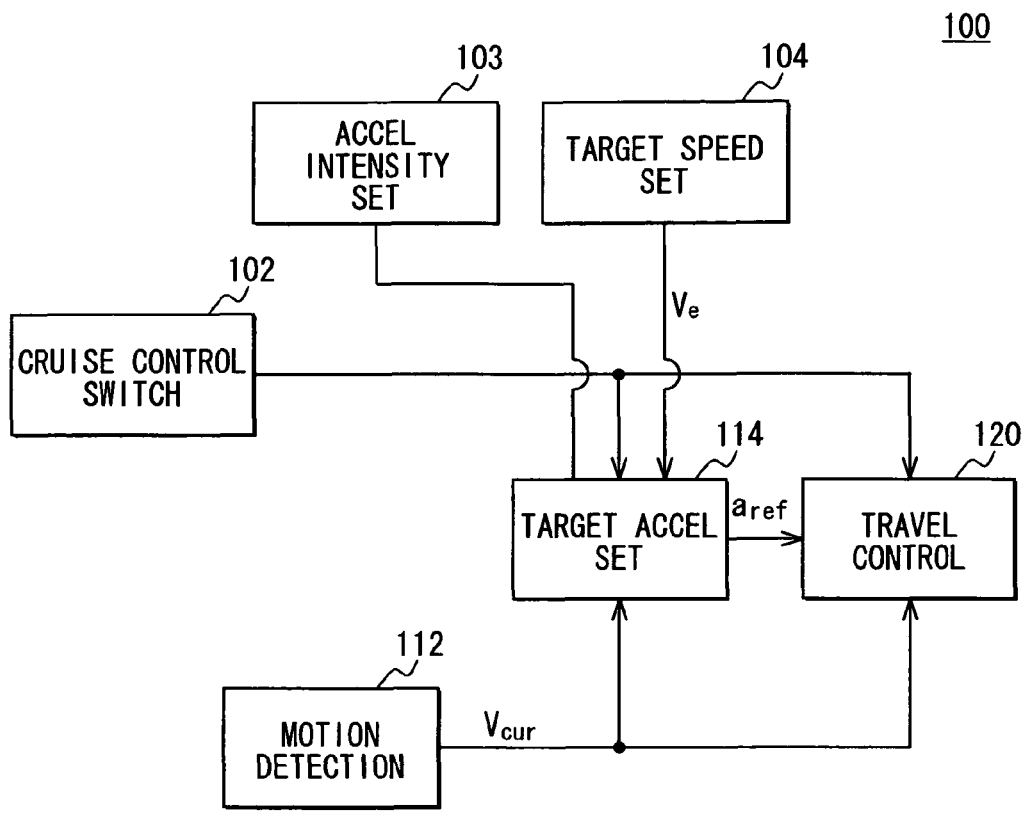
FIG. 3 is a block diagram illustrating an acceleration control deice according to an embodiment of the present invention.

Referring to FIG. 3, an embodiment of an acceleration control system 100 is described. In the acceleration control system 100, a cruise control switch 102 is operable by a driver to instruct the turn on/off of cruise control. The cruise control is for automatically accelerating the vehicle up to a target speed Ve, and maintaining the target speed after the target speed Ve is reached. When the control switch 102 is operated, a control signal is output to a target acceleration setting unit 114 and to a travel control unit 120 to instruct the turn on/off of the cruise control.

An acceleration intensity setting switch 103 is also operable by the driver for setting a desired intensity of acceleration. The acceleration intensity setting switch 103 is used for variably setting, for example, a large, intermediate or small acceleration intensity. A set value of the acceleration intensity setting switch 103 is fed to a target acceleration setting unit 114. A target speed setting device 104 is operable by the driver to set the target speed Ve, and feeds a signal representing the target speed Ve that is set to the target acceleration setting unit 114.

A vehicle motion detector device 112 is for detecting the current speed Vcur of a vehicle, and operates to successively detect the positions by using a wheel speed sensor or a GPS in order to detect the vehicle speed from a change in the position with the passage of time. The current vehicle speed Vcur detected by the vehicle motion detector device 112 is output to the target acceleration setting unit 114 and to the travel control unit 120.

The target acceleration setting unit 114 sets a target acceleration aref from when a control signal (control start signal) for instructing the turn on of cruise control is fed from the control switch 102 until a control signal (control stop signal) for instructing the turn off of cruise control is fed.

The set target acceleration aref is an initial target acceleration aref1 when the current speed Vcur is lower than the change-over speed Vc and is a secondary target acceleration aref2 when the current speed Vcur is higher than the change-over speed Vc but is lower than the target speed Ve. In order to determine the secondary target acceleration aref2, the linear relation between Go and $C_0$ shown in FIG. 2 is stored. After the current speed Vcur has reached the target speed Ve, target acceleration speeds aref3 are successively determined for effecting a constant speed control (PID control). The target speed setting unit 114, further, determines the change-over speed Vc for changing the target acceleration aref that is formed from the initial target acceleration aref1 over to the secondary target acceleration aref2.

The initial target acceleration aref1 is determined depending upon the intensity of acceleration that is set by using the acceleration intensity setting switch 103, and sets an acceleration that increases with an increase in the intensity of acceleration that is set. On the other hand, the secondary target acceleration aref2 is determined by using the initial target acceleration aref1 as Go, by determining Co (i.e., a differentiated value of the square power of the target speed) from Go and the above linear relation, and by substituting Co and the current speed Vcur for the following Equation 6. Equation 6 is acquired by transforming the intermediate side and the right side in Equation 7 which is a combination of Equation 2 and Equation 3.

$$a_{ref2} = \frac{C_0}{2V_{cur}} \qquad \text{Eq. 6}$$

$$\frac{d}{dt}V^2 = 2V\frac{d}{dt}V = C_0 \qquad \text{Eq. 7}$$

The travel control unit 120 calculates a torque instruction value according to the target acceleration aref set by the target acceleration setting unit 114 from when the control signal (control start signal) for instructing the turn-on of cruise control is fed from the control switch 102 until when the control signal (control stop signal) for instructing the turn-off of cruise control is fed. Thereafter, the torque of a prime mover (engine or motor) is controlled based on the calculated torque instruction value.

Figure 4:
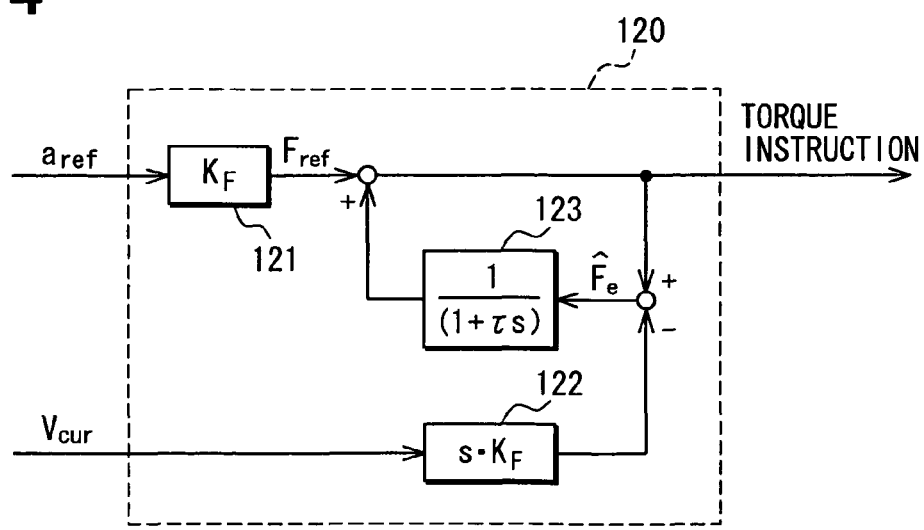
FIG. 4 is a block diagram illustrating a travel control unit shown in FIG. 3.

FIG. 4 is a block diagram illustrating the travel control unit 120. The target acceleration aref is input to a multiplier 121 where it is multiplied by a gain $K_F$ to calculate a target power Fref. The gain $K_F$ is a value set in advance by taking the weight of vehicle and the like into consideration. An actual power calculation unit 122 calculates the actual power of the vehicle 10 by using the current speed Vcur and a transfer function s·$K_F$. A difference between the target power Fref and the actual power is calculated as an estimated disturbance. After high frequency components are removed by a low pass filter 123, the estimated disturbance calculated above is added to the target power Fref. The value after added is output as a torque instruction value.

Figure 5:
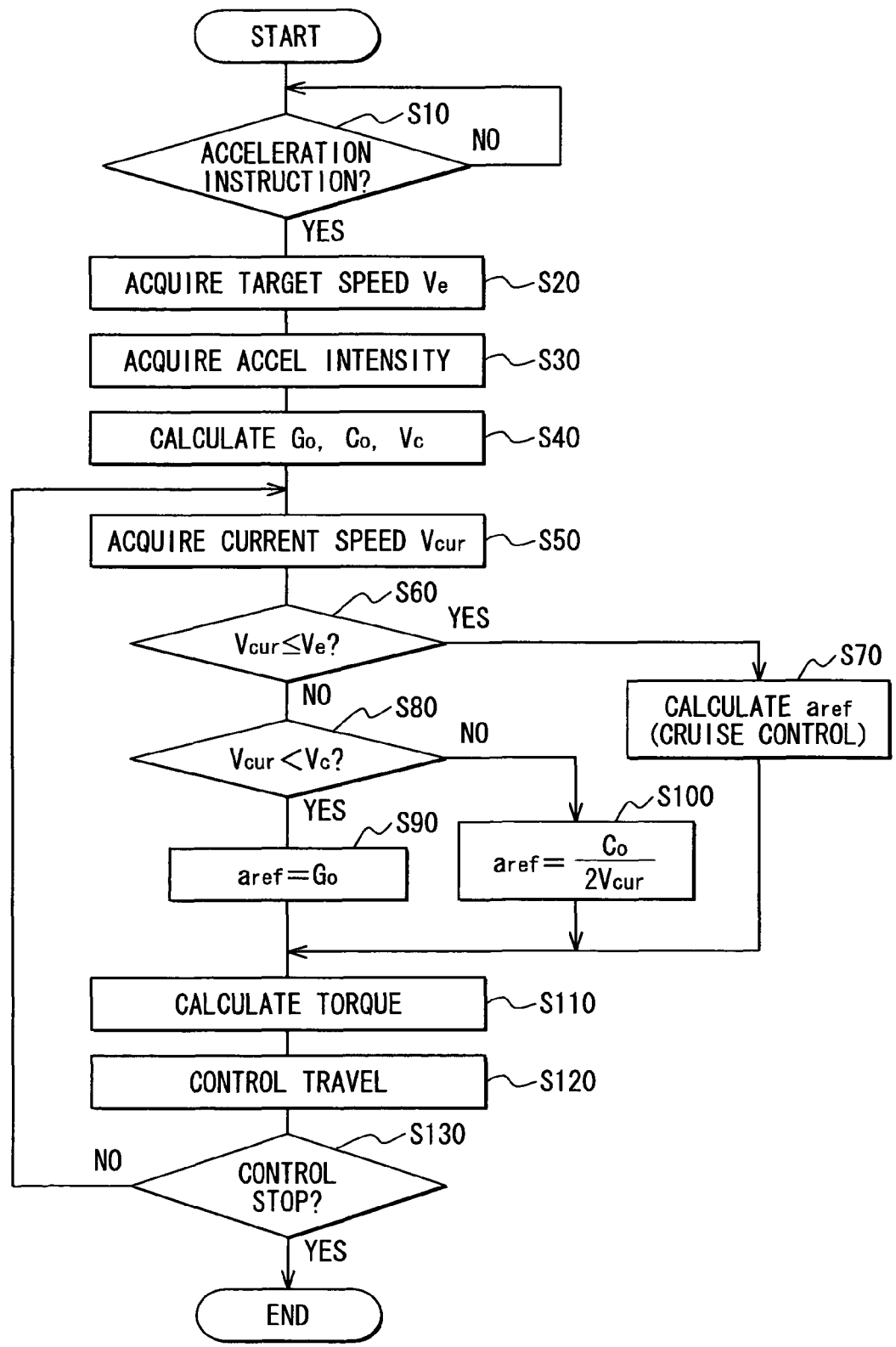
FIG. 5 is a flowchart illustrating control processing executed in the embodiment.

Next, major portions of the control processing in the acceleration control system 100 will be described by using a flowchart shown in FIG. 5. S110 to S120 are processing in the travel control unit 120, and other steps are processing in the target acceleration setting unit 114.

At S10, first, a control signal is monitored to check if an acceleration instruction is received. If the control start signal is fed, the cruise control is turned on to execute the acceleration until the target speed Ve is attained. It is therefore determined that an acceleration instruction is received if the control start signal is fed from the control switch 102 to the target acceleration setting unit 114. If it is determined that the acceleration instruction is received (YES), the routine proceeds to S20. If it is determined that no acceleration instruction is received, the determination at S10 is repeated.

At S20, the target speed Ve is acquired from the target speed setting device 104. At next S30, a set value of the intensity of acceleration is acquired that is set by operating the acceleration intensity setting switch 103.

At next S40, an initial target acceleration aref1 is determined based on the set value of the intensity of acceleration acquired at S30, and Co is determined from the above linear relation with the initial target acceleration aref1 as Go. At S40, further, Go and Co are substituted for Equation 5 to also determine the change-over speed Vc.

At next S50, the current speed Vcur is acquired from the vehicle motion detector device 112. At S60, it is checked if the current speed Vcur acquired at S50 is smaller than the target speed Ve acquired at S20. If the determination is affirmative (YES), the routine proceeds to S70 where the target acceleration aref (=aref3) is calculated for effecting the constant speed control. The constant speed control is a PID control which calculates the target acceleration aref3 according to the following Equation 8 wherein $K_P$, $K_D$ and $K_I$ are preset gains, $$a_{ref3} = \left(K_P + sK_D + \frac{K_I}{s}\right) \cdot (V_e - V_{cur}) \quad \text{Eq. 8}$$

If the determination at S60 is negative (NO), the routine proceeds to S80 where it is checked if the current speed Vcur acquired at S50 is lower than the change-over speed Vc calculated at 540. If the determination is affirmative (YES), the routine proceeds to S90. At S90, the target acceleration aref is set to be the initial acceleration aref1, i.e., set to be Go determined at S40. On the other hand, if the determination at S80 is negative (NO), the routine proceeds to S100. At S100, the secondary target acceleration aref2 acquired by substituting Co determined at S40 and the current speed Vcur acquired at S50 for Equation 6, is set to be the target acceleration aref.

After having executed S60, S90 or S100, S110 is executed. S110 is a processing in the travel control unit 120 which calculates the target power Fref from the target acceleration aref as described above, calculates the actual power from the current speed Vcur, regards a difference therebetween as an estimated disturbance, and calculates a torque instruction value by adding the estimated disturbance thereto. At S120, the torque instruction value operated at S110 is output to the prime mover.

At S130, it is checked if a control stop instruction is issued, i.e., if a control stop signal is fed from the control switch 102 to the target acceleration setting unit 114. If the determination is negative (NO), the routine returns to S50 above. In this case, therefore, the current speed Vcur is acquired again, and the target acceleration aref is calculated again by using the current speed Vcur that is acquired again. If the determination at S100 is affirmative, the routine ends. In this case, the cruise control ends.

As described above, the acceleration control system 100 stores the linear relation between the initial acceleration and the differentiated value of the square power of the speed after the speed is changed over, determines the differentiated value Co of the square power of the target speed by using the linear relation and the initial target acceleration aref1 (=Go), and determines the target acceleration (secondary target acceleration) aref2 after having changed over speed Vc by using the differentiated value Co of the square power of the target speed. Therefore, the target acceleration after having changed over speed Vc is set to be an acceleration similar to that of when the driver operates the accelerator by himself. Besides, the change-over speed Vc for changing the initial target acceleration aref1 over to the acceleration control by the secondary target acceleration aref2 is calculated from the differentiated value Co of the square power of the target speed and the initial acceleration Go. Therefore, the acceleration control based on the secondary target acceleration aref2 starts at the same time point as that of when the driver operates the accelerator by himself. Therefore, the acceleration is controlled to match the driver's feeling. Besides, the acceleration curve does not have to be adjusted in advance, and the acceleration can be easily controlled.

Further, the acceleration control system 100 is equipped with the acceleration intensity setting switch 103 for variably setting the intensity of acceleration by the driver, and the initial target acceleration aref1 is determined by a signal from the acceleration intensity setting switch 103. Therefore, the driver can attain the acceleration up to the target speed Ve maintaining the intensity of acceleration which he likes.

It should be noted that the above embodiment may be modified in many other ways.

For example, the acceleration control system 100 of the above embodiment sets the target speed Ve in advance and, if an acceleration instruction is issued, effects the acceleration up to the change-over speed Vc with the initial target acceleration aref1 determined by the acceleration intensity setting switch 103, and accelerates the vehicle with the secondary target acceleration aref2 from the change-over speed Vc up to the target speed Ve. However, it is also allowable to detect the acceleration effected by operating the accelerator by the driver in the initial stage of acceleration in a state where the target speed Ve has not been set, to determine the change-over speed Vc and the secondary target acceleration aref2 by using the above acceleration as the initial acceleration to thereby execute the acceleration control after having changed over the speed Vc. In this case, an acceleration sensor may be provided to detect the acceleration in the initial stage of acceleration. It is, further, allowable to set a relation in advance between the accelerator operation degree and the initial acceleration, to detect the accelerator operation degree in the initial stage of acceleration, and to determine the initial acceleration from the detected accelerator operation degree and the above relation.

In the above embodiment, further, the intensity of acceleration is set by using the acceleration intensity setting switch 103, and the initial target acceleration aref1 is formed based thereupon. Not being limited thereto only, however, the arrival time for arriving at the target speed Ve may be set by using the acceleration intensity setting switch 103, and the initial target acceleration aref1 and the secondary target acceleration aref2 may be formed from the arrival time and the linear relation shown in FIG. 2. If the relation of FIG. 2 exists between Go and Co, and if the target speed Ve and the arrival time for arriving at the target speed Ve are determined, then the initial target acceleration aref1 and the secondary target acceleration aref2 are settled to be the one.

Further, since the arrival time for attaining the target speed Ve and the arrival distance for attaining the target speed Ve are corresponded in a one-to-one manner, the arrival distance for arriving at the target speed Ve may be set by using the acceleration intensity setting switch 103, and the initial target acceleration aref1 and the secondary target acceleration aref2 may be formed from the arrival distance and the linear relation shown in FIG. 2.

Further, the initial target acceleration aref1 may be automatically determined without providing the acceleration intensity setting switch 103. An embodiment for automatically determining the initial target acceleration aref1 may be, for example, the one which calculates a speed difference between the current speed Vcur and the target speed Ve, and sets the initial target acceleration aref1 to a large value with an increase in the speed difference. Further, a large, intermediate or small intensity of acceleration may be determined based upon the speed difference and, thereafter, the processing may be executed in the same manner as in the above embodiment. When the acceleration operation of from the current speed Vcur up to the target speed Ve is executed by the driver himself, it is usually considered that the acceleration increases with an increase in the speed difference between the target speed Ve and the current speed Vcur. This also makes it possible to execute the acceleration control up to the target speed Ve maintaining an acceleration that matches the driver's feeling.

Further, the acceleration intensity may be set to be constant without providing the acceleration intensity setting switch 103. In this case, the driver cannot set the intensity of acceleration but the acceleration is executed maintaining a preset constant intensity which the driver does not feel offensive.

Further, the initial target acceleration aref1 may be automatically determined in a manner as described below. That is, road width detector means is provided to detect the width of the road on where the vehicle is now traveling, a relation is stored in advance according to which the initial target acceleration aref1 decreases with a decrease in the width of the road, and the initial target acceleration aref1 is determined from the width of the road detected by the road width detector means and the above relation. Further, a large, intermediate or small intensity of acceleration may be determined depending upon the width of the road and, thereafter, the processing may be executed in the same manner as in the embodiment described above. When the driver drives by himself, it is usually considered to decrease the acceleration with a decrease in the width of the road. This also makes it possible to execute the acceleration control up to the target speed Ve maintaining the acceleration that matches the driver's feeling. A road width detector device may use a vehicle-mounted camera for photographing the image of the road during the traveling, and an image analyzer for analyzing the image photographed by the vehicle-mounted camera, detecting an object of which the position changes in the image depending upon the width of the road such as a line dividing the lanes, and for determining the width of the road from the position of the object. A device may be further employed which detects the present position and determines the width of the road at the present position from road map data storing the width of the road.

Further, the initial target acceleration aref1 may be automatically determined in a manner as described below. That is, a road curvature detector is provided for detecting a curvature of the road on which the vehicle is now traveling, a relation is stored in advance according to which the initial target acceleration aref1 increases with an increase in the curvature of the road, and the initial target acceleration aref1 is determined from the curvature of the road detected by the road curvature detector means and the above relation. Further, a large, intermediate or small intensity of acceleration may be determined depending upon the curvature of the road and, thereafter, the processing may be executed in the same manner as in the embodiment described above. When the driver drives by himself or herself, it is usually considered to increase the acceleration with an increase in the curvature of the road, i.e., as the curvature becomes close to a straight line. This also makes it possible to execute the acceleration control up to the target speed Ve maintaining the acceleration that matches the driver's feeling. As the road curvature detector, a device can be employed that analyzes the image photographed by the vehicle-mounted camera or a device that determines the curvature of the road at the present position from the road map data like that of the road width detector.

According to the above embodiment, further, the control (primary control) for attaining a constant acceleration is executed before the control (secondary control) for maintaining the differentiated value of the square power of the speed constant. As will be understood from FIG. 1, however, when the driver operates the accelerator by himself or herself to accelerate the vehicle, the differentiated value of the square power of the speed remains constant in most of the period of acceleration, and the period in which the acceleration remains constant is relatively short. Therefore, the control in which the acceleration remains constant may not be executed but, instead, only the control in which the differentiated value of the square power of the speed remains constant may be executed. This also makes it possible to execute the acceleration control which is closer to when the driver accelerates the vehicle by himself than the conventional control in which a constant acceleration is continued all the way during the acceleration control.

Further, if the control is so executed that the differentiated value of the square power of the speed remains constant, the acceleration control becomes closer to when the driver accelerates the vehicle by himself or herself than in the conventional control in which a constant acceleration is continued all the way during the acceleration control. Therefore, the change-over speed Vc does not have to be the one determined by Equation 5 but may be a speed lower than the above speed or may, conversely, be a speed higher than the above speed. Moreover, another acceleration control may be executed between the primary control and the secondary control. This acceleration control may be executed before the primary control. Alternatively, the primary control may not be executed and the other acceleration control may be executed before the second control. Alternatively, the secondary control may be finished before the target speed is reached. Alternatively, the other acceleration control may be executed after the secondary control.

In the above embodiment, further, Go is first determined from the intensity of acceleration and, thereafter, Co is determined from Go and the linear relation of FIG. 2. However, Co may be determined first from the intensity of acceleration and, thereafter, Go may be determined from Co and the linear relation of FIG. 2.

What is claimed is:
1. An acceleration control system for a vehicle comprising:
means for instructing a cruise control of the vehicle; and
means for controlling acceleration of the vehicle so that a differentiated value of a square power of a speed of the vehicle remains constant which can be expressed as $dV^2/dt = Co$ during the cruise control instructed by the instructing means.

2. The acceleration control system according to claim 1, wherein:
the controlling means controls the vehicle as a primary control in an initial stage of the cruise control so that the acceleration remains constant, and thereafter controls the vehicle as a secondary control so that the differentiated value of the square power of the speed remains constant.

3. The acceleration control system according to claim 2, further comprising:
means for storing a relation between a target acceleration for the primary control and a target differentiated value of the square power of the speed for the secondary control; and
the storing means determines one of the target acceleration and the target differentiated value based on the other of the target acceleration and the differentiated value by using the relation.

4. The acceleration control system according to claim 3, wherein:
the storing means stores the relation as a linear function.

5. The acceleration control system according to claim 1, further comprising:
means for setting an intensity of acceleration,
means for setting a target differentiated value of the square power of the speed, to which the differentiated value is controlled, based on the intensity of acceleration set by the means for setting the intensity of acceleration.

6. The acceleration control system according to claim 3, further comprising:
means for setting an intensity of acceleration,
wherein the storing means sets the target acceleration and the target differentiated value, to which the differentiated value is controlled, based on the intensity of acceleration set by the setting means.

7. The acceleration control system according to claim 6, wherein:
the storing means calculates a change-over speed based on the target acceleration and the differentiated value of the square power of the target speed, and changes over from the primary control to the secondary control at the change-over speed.

8. The acceleration control system according to claim 7, further comprising:
means for setting a target speed to be attained during the cruise control;
wherein the controlling means executes the primary control when a current speed of the vehicle is lower than the change-over speed during acceleration up to the target speed, and the secondary control when the current speed of the vehicle is higher than the change-over speed during the acceleration up to the target speed.

9. The acceleration control system according to claim 5, wherein:
the means for setting the intensity of acceleration sets the intensity of acceleration based on a degree of accelerator operation in the vehicle.

10. The acceleration control system according to claim 8, wherein:
the means for setting the intensity of acceleration sets the intensity of acceleration based on a speed difference between the target speed and the current speed of the vehicle.

11. The acceleration control system according to claim 8, wherein:
the means for setting the intensity of acceleration includes an acceleration intensity setting switch, with which a driver sets an intensity of acceleration, and sets the intensity of acceleration based on a signal from the acceleration intensity setting switch.

12. The acceleration control system according to claim 11, wherein:
the acceleration intensity setting switch sets the intensity of acceleration; and
the means for setting the intensity of acceleration determines the intensity of acceleration based on a setpoint value of the acceleration intensity setting switch.

13. The acceleration control system according to claim 11, wherein:
the acceleration intensity setting switch sets an arrival time until arriving at the target speed; and
the means for setting the intensity of acceleration sets the intensity of acceleration based on the arrival time set by the acceleration intensity setting switch.

14. The acceleration control system according to claim 11, wherein:
the acceleration intensity setting switch sets an arrival distance up to arriving at the target speed; and
the means for setting the intensity of acceleration determines the intensity of acceleration based on the arrival distance set by the acceleration intensity setting switch.

15. The acceleration control system according to claim 5, further comprising:
means for detecting a width of a road on which the vehicle is traveling,
wherein the means for setting the intensity of acceleration sets the width of the road detected by the detecting means as the intensity of acceleration.

16. The acceleration control system according to claim 5, further comprising:
means for detecting a curvature of a road on which the vehicle is traveling,
wherein the means for setting the intensity of acceleration sets the curvature of the road detected by the detecting means as the intensity of acceleration.

17. The acceleration control system according to claim 5, wherein:
the means for setting the intensity of acceleration sets the intensity of acceleration based on a present acceleration of the vehicle.

18. The acceleration control system according to claim 17, further comprising:
an acceleration sensor for detecting acceleration of the vehicle,
wherein the means for setting the intensity of acceleration sets the intensity of acceleration based on the present acceleration of the vehicle detected by the acceleration sensor.

* * * * *